US008924486B2

(12) United States Patent
Daskalopoulos et al.

(10) Patent No.: US 8,924,486 B2
(45) Date of Patent: *Dec. 30, 2014

(54) METHOD AND SYSTEM FOR AGGREGATING COMMUNICATIONS

(75) Inventors: Vasilios Vasilios Daskalopoulos, Edison, NJ (US); Gustav Gerald Vos, Surrey (CA)

(73) Assignee: Sierra Wireless, Inc., Richmond (CA)

( * ) Notice: Subject to any disclaimer, the term of this patent is extended or adjusted under 35 U.S.C. 154(b) by 169 days.

This patent is subject to a terminal disclaimer.

(21) Appl. No.: 12/370,421

(22) Filed: Feb. 12, 2009

(65) Prior Publication Data

US 2010/0205260 A1 Aug. 12, 2010

(51) Int. Cl.
*G06F 15/16* (2006.01)

(52) U.S. Cl.
USPC ........... 709/206; 709/202; 709/203; 709/205; 709/217

(58) Field of Classification Search
USPC .................. 709/206, 202, 203, 205, 217
See application file for complete search history.

(56) References Cited

U.S. PATENT DOCUMENTS

| | | | |
|---|---|---|---|
| 5,481,254 A * | 1/1996 | Gaskill et al. ............... | 340/9.11 |
| 5,606,668 A | 2/1997 | Shwed | |
| 5,996,021 A | 11/1999 | Civanlar | |
| 6,049,834 A | 4/2000 | Khabardar | |
| 6,058,431 A | 5/2000 | Srisuresh | |
| 6,101,189 A | 8/2000 | Tsuruoka | |
| 6,161,144 A | 12/2000 | Michels | |
| 6,182,185 B1 | 1/2001 | Stokes | |
| 6,353,614 B1 | 3/2002 | Borella | |
| 6,363,421 B2 | 3/2002 | Barker | |
| 6,453,357 B1 | 9/2002 | Crow | |
| 6,453,358 B1 | 9/2002 | Michels | |
| 6,549,519 B1 | 4/2003 | Michels | |
| 6,553,000 B1 | 4/2003 | Ganesh | |
| 6,579,663 B2 | 6/2003 | Wolf | |
| 6,606,316 B1 | 8/2003 | Albert | |
| 6,618,757 B1 | 9/2003 | Babbitt | |

(Continued)

FOREIGN PATENT DOCUMENTS

| | | |
|---|---|---|
| CA | 2 248 577 C | 11/2002 |
| CN | 101552848 A | 10/2009 |

(Continued)

OTHER PUBLICATIONS

Eronen, P., "TCP Wake-Up: Reducing Keep-Alive Traffic in Mobile IPv4 and IPsec NAT Traversal," Document No. NRC-TR-2008-002, Nokia Research Center, Jan. 31, 2008, 9 pages.

(Continued)

*Primary Examiner* — Lan-Dai T Truong
(74) *Attorney, Agent, or Firm* — Christensen O'Connor Johnson Kindness PLLC

(57) ABSTRACT

The present invention provides for method, system, and apparatus for facilitating communication between a first set of networked devices, such as client devices, and a second networked device, such as a server. A query message is transmitted from a representative device of the first set of networked devices, to the second networked device. The representative device may be selected in several ways. A response message may be transmitted from the second networked device, the message comprising an indication of devices from the first set of networked devices for which communications are pending. The response message is processed and devices identified in the response message are notified.

12 Claims, 6 Drawing Sheets

(56) References Cited

U.S. PATENT DOCUMENTS

| | | | |
|---|---|---|---|
| 6,631,416 B2 | 10/2003 | Bendinelli | |
| 6,680,943 B1 | 1/2004 | Gibson | |
| 6,687,252 B1 | 2/2004 | Bertrand | |
| 6,711,147 B1 | 3/2004 | Barnes | |
| 6,804,707 B1 | 10/2004 | Ronning | |
| 6,865,184 B2 | 3/2005 | Thubert | |
| 6,888,927 B1* | 5/2005 | Cruickshank et al. | 379/88.11 |
| 6,937,863 B1 | 8/2005 | Gordon | |
| 6,944,672 B2 | 9/2005 | Crow | |
| 6,954,790 B2 | 10/2005 | Forslöw | |
| 6,956,854 B2 | 10/2005 | Ganesh | |
| RE38,902 E | 11/2005 | Srisuresh | |
| 6,993,595 B1 | 1/2006 | Luptowski | |
| 6,996,628 B2 | 2/2006 | Keane | |
| 7,023,847 B2 | 4/2006 | Zhang | |
| 7,028,333 B2 | 4/2006 | Tuomenoksa | |
| 7,031,328 B2 | 4/2006 | Thubert | |
| 7,043,564 B1 | 5/2006 | Cook | |
| 7,051,116 B1 | 5/2006 | Rodriguez-Val | |
| 7,058,973 B1 | 6/2006 | Sultan | |
| 7,068,667 B2 | 6/2006 | Foster | |
| 7,076,594 B2 | 7/2006 | Benedetto | |
| 7,085,854 B2 | 8/2006 | Keane | |
| 7,126,948 B2 | 10/2006 | Gooch | |
| 7,139,822 B2 | 11/2006 | Guenther | |
| 7,139,828 B2 | 11/2006 | Alkhatib | |
| 7,159,109 B2 | 1/2007 | Egevang | |
| 7,181,766 B2 | 2/2007 | Bendinelli | |
| 7,190,696 B1 | 3/2007 | Manur | |
| 7,197,661 B1 | 3/2007 | Reynolds | |
| 7,215,777 B2 | 5/2007 | Deen | |
| 7,237,260 B2 | 6/2007 | Yu | |
| 7,245,622 B2 | 7/2007 | Huitema | |
| 7,266,119 B2 | 9/2007 | Fan | |
| 7,269,663 B2 | 9/2007 | Beier | |
| 7,272,650 B2 | 9/2007 | Elgebaly | |
| 7,293,108 B2 | 11/2007 | Warrier | |
| 7,302,493 B1 | 11/2007 | Alles | |
| 7,313,618 B2 | 12/2007 | Braemer | |
| 7,333,453 B2 | 2/2008 | Wu | |
| 7,340,535 B1 | 3/2008 | Alam | |
| 7,356,045 B2 | 4/2008 | Satapati | |
| 7,362,760 B2 | 4/2008 | Wang | |
| 7,366,188 B2 | 4/2008 | Kim | |
| 7,370,194 B2 | 5/2008 | Morais | |
| 7,379,475 B2 | 5/2008 | Minami | |
| 7,386,641 B2 | 6/2008 | Xu | |
| 7,406,534 B2 | 7/2008 | Syvänne | |
| 7,411,917 B1 | 8/2008 | Hardie | |
| 7,411,975 B1 | 8/2008 | Mohaban | |
| 7,426,194 B2 | 9/2008 | Shenfield | |
| 7,441,043 B1 | 10/2008 | Henry | |
| 7,443,859 B2 | 10/2008 | Sengodan | |
| 7,443,867 B2 | 10/2008 | El-Beik | |
| 7,461,142 B2 | 12/2008 | Wadekar | |
| 7,483,999 B2 | 1/2009 | Weyman | |
| 7,484,005 B2 | 1/2009 | Rodriguez-Val | |
| 7,523,197 B2 | 4/2009 | Castaneda | |
| 7,529,230 B2 | 5/2009 | Lewis | |
| 7,529,810 B2 | 5/2009 | Goto | |
| 7,558,877 B1* | 7/2009 | Fedyk et al. | 709/242 |
| 7,577,746 B2 | 8/2009 | Shima | |
| 7,587,209 B2 | 9/2009 | Bianconi | |
| 7,587,490 B2 | 9/2009 | Guenther | |
| 7,606,191 B1 | 10/2009 | Breau | |
| 7,684,397 B2 | 3/2010 | Kim | |
| 7,702,646 B2 | 4/2010 | Rabines | |
| 7,949,785 B2 | 5/2011 | Alkhatib | |
| 8,050,684 B2 | 11/2011 | Lewis | |
| 8,228,848 B2 | 7/2012 | Vos | |
| 8,301,753 B1 | 10/2012 | Melvin | |
| 2001/0052006 A1 | 12/2001 | Barker | |
| 2002/0004834 A1 | 1/2002 | Guenther | |
| 2002/0026503 A1 | 2/2002 | Bendinelli | |
| 2002/0026531 A1 | 2/2002 | Keane | |
| 2002/0029276 A1 | 3/2002 | Bendinelli | |
| 2002/0056008 A1 | 5/2002 | Keane | |
| 2002/0091859 A1 | 7/2002 | Tuomenoksa | |
| 2002/0107980 A1 | 8/2002 | Kawaguchi | |
| 2002/0114286 A1* | 8/2002 | Iwamura et al. | 370/252 |
| 2002/0131395 A1 | 9/2002 | Wang | |
| 2002/0138622 A1 | 9/2002 | Dorenbosch | |
| 2002/0143773 A1 | 10/2002 | Spicer | |
| 2002/0184316 A1 | 12/2002 | Thomas | |
| 2003/0007486 A1 | 1/2003 | March | |
| 2003/0108055 A1 | 6/2003 | Damon | |
| 2003/0177236 A1 | 9/2003 | Goto | |
| 2003/0182448 A1 | 9/2003 | Gooch | |
| 2004/0122929 A1 | 6/2004 | Wadekar | |
| 2004/0148406 A1 | 7/2004 | Shima | |
| 2004/0153858 A1 | 8/2004 | Hwang | |
| 2005/0021603 A1 | 1/2005 | Yokomitsu | |
| 2005/0027875 A1 | 2/2005 | Deng | |
| 2005/0198383 A1 | 9/2005 | Rose | |
| 2006/0036765 A1 | 2/2006 | Weyman | |
| 2006/0095969 A1 | 5/2006 | Portolani | |
| 2006/0129698 A1 | 6/2006 | Rodriguez-Val | |
| 2006/0190587 A1 | 8/2006 | Sylvest | |
| 2006/0209822 A1 | 9/2006 | Hamamoto | |
| 2007/0136463 A1 | 6/2007 | Guenther | |
| 2007/0214256 A1 | 9/2007 | Castaneda | |
| 2007/0268829 A1 | 11/2007 | Corwin | |
| 2007/0288613 A1 | 12/2007 | Sudame | |
| 2007/0294416 A1 | 12/2007 | Agre | |
| 2007/0297430 A1 | 12/2007 | Nykanen | |
| 2008/0005310 A1 | 1/2008 | Xu | |
| 2008/0037534 A1 | 2/2008 | Shina | |
| 2008/0052395 A1 | 2/2008 | Wright | |
| 2008/0098088 A1 | 4/2008 | Tamano | |
| 2008/0120512 A1 | 5/2008 | Wang | |
| 2008/0168181 A1 | 7/2008 | Berkvens | |
| 2008/0198850 A1 | 8/2008 | Cooper | |
| 2008/0209035 A1 | 8/2008 | Barranco | |
| 2008/0209068 A1 | 8/2008 | Herzog | |
| 2008/0225865 A1 | 9/2008 | Herzog | |
| 2008/0233922 A1 | 9/2008 | Lesrel | |
| 2008/0244260 A1 | 10/2008 | Feldman | |
| 2008/0246605 A1* | 10/2008 | Pfeffer et al. | 340/540 |
| 2008/0313255 A1 | 12/2008 | Geltner | |
| 2009/0034496 A1 | 2/2009 | Ko | |
| 2009/0282123 A1* | 11/2009 | Fornari | 709/207 |
| 2010/0110956 A1* | 5/2010 | Hepworth et al. | 370/312 |
| 2010/0189103 A1 | 7/2010 | Bachmann | |
| 2011/0011024 A1 | 1/2011 | Pellicer | |
| 2012/0023257 A1 | 1/2012 | Vos | |
| 2012/0203909 A1 | 8/2012 | Kavanaugh | |

FOREIGN PATENT DOCUMENTS

| | | |
|---|---|---|
| EP | 1 096 739 A2 | 5/2001 |
| EP | 1 229 442 A2 | 8/2002 |
| EP | 1 619 868 A2 | 7/2005 |
| WO | 2002/096128 A2 | 11/2002 |
| WO | 2004/006603 A2 | 1/2004 |
| WO | 2004/034715 A1 | 4/2004 |
| WO | 2005/017707 A2 | 2/2005 |
| WO | 2005/018204 A1 | 2/2005 |
| WO | 2005/081499 A1 | 9/2005 |
| WO | 2006/012612 A1 | 2/2006 |
| WO | 2007/012359 A1 | 2/2007 |
| WO | 2007/125434 A2 | 11/2007 |
| WO | 2008/139033 A1 | 11/2008 |
| WO | 2009/127254 A1 | 10/2009 |
| WO | 2010/054471 A1 | 5/2010 |
| WO | 2010/091506 A1 | 8/2010 |
| WO | 2011/054079 A1 | 5/2011 |
| WO | 2012/106820 A1 | 8/2012 |

OTHER PUBLICATIONS

"WAP Push Architectural Overview, Version Jul. 3, 2001 (Wireless Application Protocol WAP-250-PushArchOverview—Jul. 3, 2001-a)," © 2001 Wireless Application Protocol Forum, Ltd., 24 pages.

(56) References Cited

OTHER PUBLICATIONS

Landfeldt, S., et al., "Providing Scalable and Deployable Addressing in Third Generation Cellular Networks," IEEE Wireless Communications 10(1):36-42, Feb. 2003.
International Search Report mailed Feb. 25, 2010, issued in corresponding International Application No. PCT/CA2009/001622, filed Nov. 17, 2009, 5 pages.
International Searching Authority Written Opinion mailed Feb. 25, 2010, issued in corresponding International Application No. PCT/CA2009/001622, filed Nov. 17, 2009, 6 pages.
International Search Report mailed Jun. 3, 2010, issued in corresponding International Application No. PCT/CA2010/000182, filed Feb. 12, 2010, 4 pages.
International Searching Authority Written Opinion mailed Jun. 3, 2010, issued in corresponding International Application No. PCT/CA2010/000182, filed Feb. 12, 2010, 4 pages.
International Search Report mailed Sep. 21, 2010, issued in corresponding International Application No. PCT/CA2010/000704, filed May 12, 2010, 3 pages.
International Searching Authority Written Opinion mailed Sep. 21, 2010, issued in corresponding International Application No. PCT/CA2010/000704, filed May 12, 2010, 4 pages.
International Search Report mailed May 9, 2012, issued in corresponding International Application No. PCT/CA2012/050070, filed Feb. 8, 2012, 4 pages.
International Searching Authority Written Opinion mailed May 9, 2012, issued in corresponding International Application No. PCT/CA2012/050070, filed Feb. 8, 2012, 4 pages.
Office Action mailed Dec. 8, 2011, from U.S. Appl. No. 12/620,372, filed Nov. 17, 2009, now U.S. Patent No. 8,228,848, 5 pages.
Office Action mailed Jan. 17, 2013, from U.S. Appl. No. 13/109,342, filed May 17, 2011, now U.S. Patent Application Publication No. 2012/0023257, 11 pages.
Office Action mailed Jun. 19, 2013, from U.S. Appl. No. 13/109,342, filed May 17, 2011, now U.S. Patent Application Publication No. 2012/0023257, 17 pages.
Bauer, J., "What Is Port Triggering?" © 2010 PortForward.com, <http://www.portforward.com/help/porttriggering.htm>, 2 pages.
Bernard, T., "NAT Port Mapping Protocol (NAT-PMP)," MiniUPnP Project, first published Sep. 2006, last updated Sep. 2008, <http://miniupnp.free.fr/nat-pmp.html>, 4 pages.
Braden, R. (ed.), "Requirements for Internet Hosts—Application and Support," Internet Engineering Task Force, Network Working Group, Request for Comments: 1123, Oct. 1989, 97 pages.
Braden, R. (ed.), "Requirements for Internet Hosts—Communication Layers," Internet Engineering Task Force, Network Working Group, Request for Comments: 1112, Oct. 1989, 115 pages.
Chan, S., et al., "Devices Profile for Web Services," Microsoft Corporation, Feb. 2006, 39 pages.
Cheshire, S., et al., "NAT Port Mapping Protocol (NAT-PMP)," Internet Engineering Task Force, Internet-Draft, Apr. 16, 2008, <draft-cheshire-nat-mpm-03.txt>, 28 pages.
CT3, "Reply LS on Direct Stage 3 Work for NIMTC Functionality," 3rd Generation Partnership Project, Report SP-100664, TSG SA Meeting #50, Istambul, Turkey, Dec. 13-15, 2010, 2 pages.
Droms, R., "Dynamic Host Configuration Protocol," Internet Engineering Task Force, Network Working Group, Request for Comments: 2131, Mar. 1997, <http://www.ietf.org/rfc/rfc2131.txt> [retrieved Jul. 12, 2013], 43 pages.
Goland, Y.Y., et al., "Simple Service Discovery Protocol/1.0 Operating Without an Arbiter," Internet Engineering Task Force, Internet-Draft, Oct. 28, 1999, <draft-cai-ssdp-v1-03.txt>, 18 pages.
Guttman, E., "Zeroconf Host Profile Applicability Statement," Internet Engineering Task Force, Internet-Draft, Jul. 20, 2001, <draft-ietf-zeroconf-host-prof-01.txt>, 10 pages.

Huawei, "MTC Server Communicate With MTC Devices Without Exclusive MSISDN Via SMS," 3rd Generation Partnership Project, Report TD S2-102270, 3GPP TSG SA WG2 Meeting #79, Kyoto, May 10-14, 2010, 3 pages.
Huawei, "A Solution for Group Based Addressing," 3rd Generation Partnership Project, Report TD S2-102271, 3GPP TSG SA WGS Meeting #79, Kyoto, May 10-14, 2010, 4 pages.
Karir, M., et al., "PE-ARP: Port Enhanced ARP for IPv4 Address Sharing," presented at NANOG (North American Network Operators Group) 47, Dearborn, Mich., Oct. 18-21, 2009, 7 pages.
Rekhter, Y., et al., "Address Allocation for Private Internets," Internet Engineering Task Force, Network Working Group, Request for Comments: 1918, Feb. 1996, 10 pages.
Rosenberg, J., et al., "Session Traversal Utilities for NAT (STUN)," Internet Engineering Task Force, Network Working Group, Request for Comments: 5389, Oct. 2008, 52 pages.
Samsung, "SIP URIs for Devices Without MSISDN," 3rd Generation Partnership Project, Report TD S2-102425, 3GPP TSG SA WG2 Meeting #79, Kyoto, May 10-14, 2010, 4 pages.
Schlimmer, J., "A Technical Introduction to the Devices Profile for Web Services," Web Services Technical Articles, Microsoft Corporation, May 2004, 5 pages.
Srisuresh, P., and M. Holdrege, "IP Network Address Translator (NAT) Terminology and Considerations," Internet Engineering Task Force, Network Working Group, Request for Comments: 2663, Aug. 1999, 31 pages.
Srisuresh, P., and K. Egevang, "Traditional IP Network Address Translator (Traditional NAT)," Internet Engineering Task Force, Network Working Group, Request for Comments: 3022, Jan. 2001, 17 pages.
Tsirtsis, G., and P. Srisuresh, "Network Address Translation—Protocol Translation (NAT-PT)," Internet Engineering Task Force, Network Working Group, Request for Comments: 2766, Feb. 2000, 20 pages.
"Universal Plug and Play," Wikipedia, The Free Encyclopedia, Nov. 12, 2008, <https://en.wikipedia.org/wiki/Universal_Plug_and_Play>, 15 pages.
"3rd Generation Partnership Project; Technical Specification Group Core Network and Terminals; Value-Added Services for SMS (VAS4SMS); Interface and Signalling Flow (Release 9)," Technical Specification 3GPP TS 23.142 V9.0.1, 3GGP, Valbonne, France, Dec. 2009, 26 pages.
"3rd Generation Partnership Project; Technical Specification Group Services and System Aspects; System Service Requirements for Machine-Type Communications (MTC); Stage 1 (Release 11)," Technical Specification 3GPP TS 22.368 V11.0.0, 3GGP, Valbonne, France, Dec. 2010, 23 pages.
"3rd Generation Partnership Project; Technical Specification Group Services and System Aspects; System Improvements for Machine-Type Communications (Release 10)," Technical Report 3GPP TR 23.888 V0.5.1, 3GGP, Valbonne, France, Jul. 2010, 75 pages.
Du, L., et al., "Intelligent Cellular Network Load Balancing Using a Cooperative Negotiation Approach," IEEE Wireless Communications and Networking (WCNC 2003), New Orleans, Mar. 16-20, 2003, vol. 3, pp. 1675-1679.
Office Action mailed Dec. 5, 2013, from U.S. Appl. No. 13/109342, filed May 17, 2011, 14 pages.
Office Action mailed Aug. 27, 2013, from U.S. Appl. No. 13/368914, filed Feb. 8, 2012, 22 pages.
Final Office Action mailed Jun. 13, 2014, from corresponding U.S. Appl. No. 13/368,914, filed Feb. 8, 2012.
Notice of Allowance mailed Apr. 11, 2014, from corresponding U.S. Appl. No. 13/109,342, filed May 17, 2011.
Supplementary European Search Report mailed Jun. 4, 2014, issued in corresponding European Application No. EP 10 74 0871, filed Feb. 12, 2010, 5 pages.

\* cited by examiner

METHOD AND SYSTEM FOR AGGREGATING COMMUNICATIONS

FIELD OF THE INVENTION

The present invention pertains in general to communication networks and in particular to a method and system for aggregating communications between a first set of networked devices and a second networked device.

BACKGROUND

Communication networks are deployed worldwide to carry a variety of digital and analog information such as voice, video, and data between networked devices. Multi-hop and data forwarding, interconnection of networks and sub-networks, and other capabilities enable wide-ranging communication services to be provided to devices communicating over a variety of wired (electrical or optical) and/or wireless networks, for example.

Due to practical considerations, network communication is often limited in one or more ways. For example, servers and store-and-forward networked devices such as routers can only handle communications at a limited rate. When a large number of devices attempt to concurrently communicate with or through such a device, quality of the communications may therefore degrade.

As another example, network or sub-network boundaries may need to be traversed to facilitate a desired communication path. Such boundaries may exist at the interface between technologically disparate portions of a network, for example between a wired and wireless network, or between different types of wired and/or wireless networks. Boundaries may also exist for security or network administration purposes. For example, a network may be protected or regulated by a firewall, or a network address translation (NAT) device may exist at a network boundary.

An example network scenario, potentially illustrating such limitations, is depicted in FIG. 1. Mobile devices 110a-110f, such as wireless phones, PDAs, and laptop computers associated with a first sub-network 120 such as a mobile network operator's (MNO) network may require periodic communication, across a sub-network boundary 130, with devices such as internet protocol (IP) based devices residing outside the first sub-network 120, for example a server 140. The sub-network boundary 130 may include a firewall or network address translator (NAT), for example. The server 140 may be accessible through an external network or sub-network 135, and mobile devices 110a-110f, may each independently communicate with one or more servers 140 to obtain content pertaining to email, device management, news updates, multimedia messages, or other information.

In some instances, mobile devices such as illustrated in FIG. 1 may not have a publicly routable IP address, for example when they are part of a private address space behind the MNO's firewall and/or NAT, wherein in FIG. 1, the NAT can be positioned above the sub-network boundary 130. Applications running on such mobile devices may therefore be designed in such a way that data transactions are initiated by the mobile device to connect to a server which does have a publicly routable IP address. Thus, the server can respond to a mobile device once a transaction is initiated, but cannot initiate a transaction on its own.

However, there are also cases where the ability for the server to initiate a transaction with the mobile device is desired, for example when a device management server wishes to query the mobile devices to retrieve various diagnostics. Server-initiated transactions may be problematic since they may be prevented by the configuration of devices at the network boundary. For example a NAT may block incoming IP-based communications from the server to a mobile device, either due to configuration or technological limitations such as an inability for the NAT to retain an open port indefinitely for access to every mobile device.

To address this and other problems, the Open Mobile Alliance (OMA) has standardized the Wireless Application Protocol (WAP), including the use of WAP Push. This is a mechanism of waking up a mobile device via Short Message Service (SMS) to prompt it to initiate a session with the server. However, there are cases where SMS is not available or is deemed too expensive either in cost or in latency to be viable for a large number of mobile devices. WAP Push also requires the server to have the security access or authorization to send SMS messages to the mobile device network.

As another approach, applications running on mobile devices, such as email, instant messaging, games, etc. can be configured to circumvent the problem of blocked server-initiated communications. In such applications, mobile devices periodically poll a server to determine if the server has any messages pending for it. The server can typically respond through the NAT or firewall since such mobile device-initiated communication typically opens a temporary return communication path from the server to the mobile device. However, polling solutions necessarily involve a certain amount of latency in delivery of messages to the client, for example the mobile device.

However, there are applications, such as those pertaining to mobile device management, where the server needs to have a short and sometimes predictable amount of latency in getting a message to the mobile device. In general, there is a trade-off between latency and the consumption of system resources. For example, a mobile device which polls very often will reduce the latency, but at the expense of an undesirably reduced battery life. In addition, if multiple mobile devices frequently conduct polling, undesirably heavy demand is placed on both the servers being polled and the devices along the network boundary. For example, such demands over a given time interval can be viewed as roughly proportional to the product of the number of mobile devices and their average polling frequency. Heavy demand can reduce quality of service and work against the desire to reduce latency. That is, such methods are not scalable.

In a related approach, client polling, as described above, is performed often enough to maintain an open return path through the network boundary or NAT, so that the server can send messages back to the mobile device asynchronously as long as the return path remains open. This may require the mobile device, the server, or both to periodically send keep-alive messages to prevent the mapping in the NAT from timing out. This approach still relies on client polling at a minimum frequency, but reduces latency of messages sent to the mobile device since the server can initiate communication through the return path maintained through polling. However, mobile devices are still required to expend a significant amount of energy, and use a significant amount of network resources, to maintain the open return path. Moreover, if several mobile devices perform this approach, the NAT and server may become overwhelmed with polling requests.

More generally, maintaining multiple open communication paths in a point-to-multipoint network, such as a network comprising a server serving multiple clients or mobile devices, may require a degree of network overhead which significantly stresses portions of the network if performed according to the above prior art methods. For example, polling or keep-alive messages may stress servers, routers, firewalls, NATs, and/or clients within the network. As network size increases, requirements such as low latency become increasingly difficult to satisfy due to the need to directly maintain multiple network paths in such a network using traditional approaches.

Therefore there is a need for a method and system for communicating between a first set of networked devices and a second networked device that is not subject to one or more limitations in the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and system for aggregating communications. In accordance with an aspect of the present invention, there is provided a method for facilitating communication between a first set of two or more networked devices and a second networked device, the method comprising the steps of: transmitting a query message from a representative device to the second networked device, the representative device belonging to the first set of two or more networked devices; and providing one or more responses to the query message by the second networked device, wherein the one or more responses facilitate transmission of one or more communications pending from the second networked device to members of the first set of two or more networked devices.

In accordance with another aspect of the present invention, there is provided a computer readable medium having recorded thereon statements and instructions for execution by one or more computers to carry out a method for facilitating communication between a first set of two or more networked devices and a second networked device, the method comprising the steps of: transmitting a query message from a representative device to the second networked device, the representative device belonging to the first set of two or more networked devices; and providing one or more responses to the query message by the second networked device, wherein the one or more responses facilitate transmission of one or more communications pending from the second networked device to members of the first set of two or more networked devices.

In accordance with another aspect of the present invention, there is provided a system for facilitating communication between a first set of two or more networked devices and a second networked device, the system comprising: means for transmitting a query message from a representative device to the second networked device, the representative device belonging to the first set of two or more networked devices; and means for providing one or more responses to the query message by the second networked device, wherein the one or more responses are configured to facilitate transmission of one or more communications pending from the second networked device to members of the first set of two or more networked devices.

BRIEF DESCRIPTION OF THE FIGURES

These and other features of the invention will become more apparent in the following detailed description in which reference is made to the appended drawings.

DETAILED DESCRIPTION OF THE INVENTION

Definitions

Figure 1:
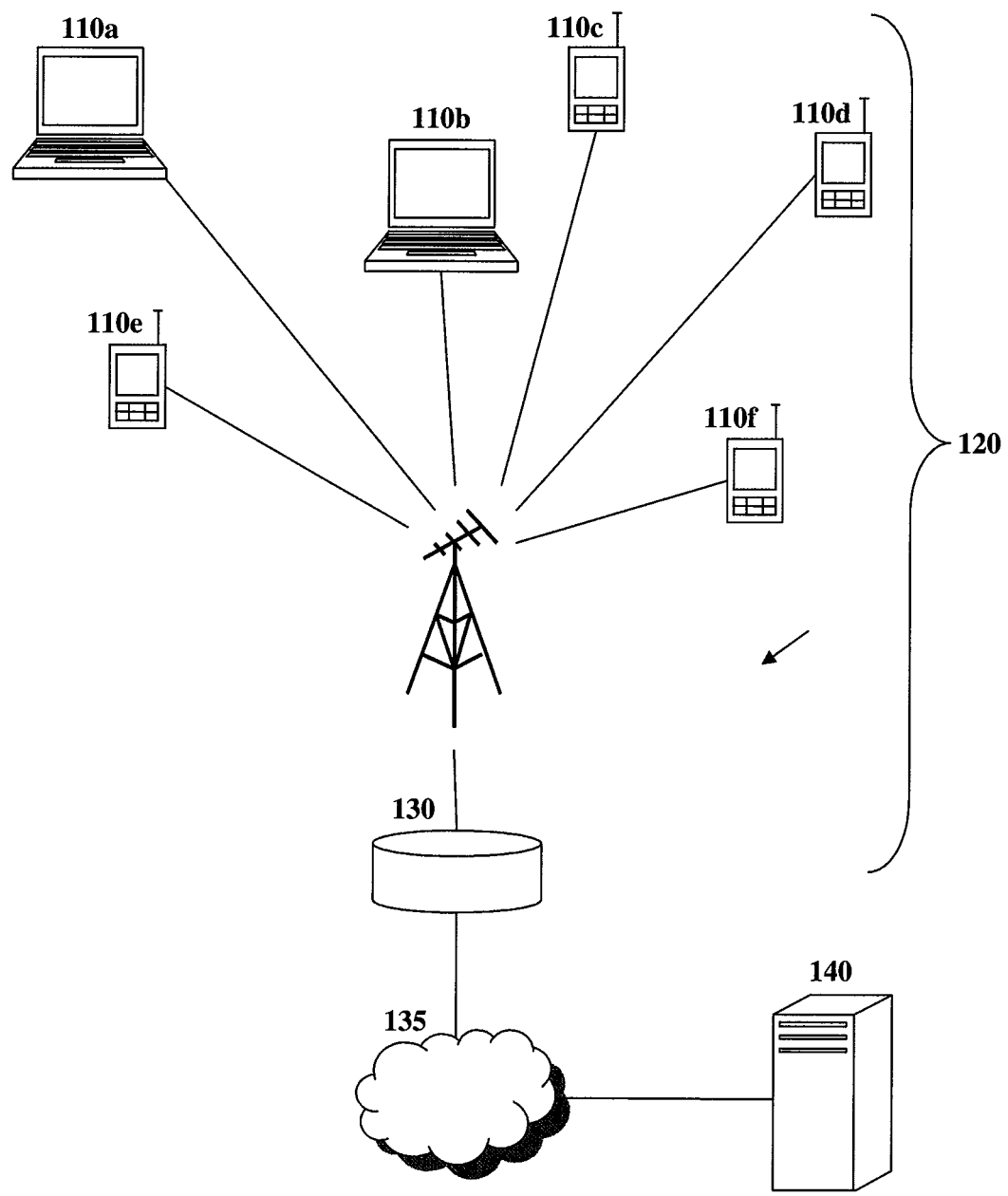
FIG. 1 illustrates a networked system of devices according to the prior art.

The term "network" is used to define means by which a collection of devices are communicatively linked to each other through one or more communication paths, which may also refer to communication links, channels and/or media. A network can be a wired, wireless or optical network, for example, or a combination thereof. Not all communication paths in a network need to be direct paths. Rather, a portion of communication paths may be indirect, for example using multi-hop capabilities to forward or relay messages through one or more intermediate devices. Moreover, it is not required that an indirect path exist between all devices linked by a network. However, a typical network, directly or indirectly communicatively links most devices with a substantial proportion of other devices.

The term "sub-network" is used to define a portion of a network, which interfaces with other portions of the network, or with one or more other sub-networks, across a sub-network boundary. For example, a sub-network boundary can comprise one or more firewalls, routers, hubs, switches, or the like. A sub-network boundary may also be arbitrarily defined. The term "sub-network" may be used to refer to a portion of a network either "inside" or "outside" a sub-network boundary. If the sub-network boundary comprises a device, there may be an indirect communication path, via such a device, linking devices on either side of the sub-network boundary.

The term "networked device" is used to define an electronic device, such as a computer, cellular telephone, PDA, server, router, firewall, NAT, or other electronic device equipped for wired, wireless or optical communication and at least intermittently communicatively linked via a network with one or more other networked device.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides a method, system, and associated apparatus for facilitating communication between a first set of two or more networked devices, such as a set of client devices and a second networked device, such as a server. The invention provides for transmitting a query message from a representative device to the second networked device, wherein the representative device belongs to the first set of two or more networked devices or client devices.

According to the present invention, transmission of the query message facilitates one or more responses by the second networked device, wherein the one or more responses can facilitate transmission of one or more communications pending from the second networked device to the representative device and/or one or more other members of the first set of two or more networked devices.

In some embodiments, the invention provides for transmitting a response message from the second networked device to the representative device. The response message comprises an indication of a subset of the first set of two or more networked devices for which one or more communications are pending. For example, a server may append in its response to the representative device a partial or full list of client devices for which the server has messages pending. The invention further provides for processing the response message, for example at the representative device, to identify one or more networked devices belonging to the subset. The invention further provides for transmitting a notification to some or all of the subset of networked devices identified in the response message as having communications pending. The notified devices may then retrieve the pending messages by transmitting a message retrieval request to the second networked device.

Embodiments of the invention may be directed toward reducing network overhead involved in maintaining communication paths between multiple client devices and one or more server devices. For example, instead of maintaining independent communication paths for each client device and a server, one or more representative devices may maintain communication paths on behalf of multiple other devices. A representative device can then forward messages or indications of pending messages from the server to one or more of the plural other client devices when required, and/or trigger other client devices to establish another communication path to the server if required. The representative device thereby acts as a communication relay as well as a device for facilitating maintenance of communication paths.

In embodiments of the invention, the selection of representative devices can be fixed or can vary in time, and can operate by different methods, according to different embodiments of the present invention. In some embodiments, representative devices can arise on an ad-hoc basis.

Figure 2:
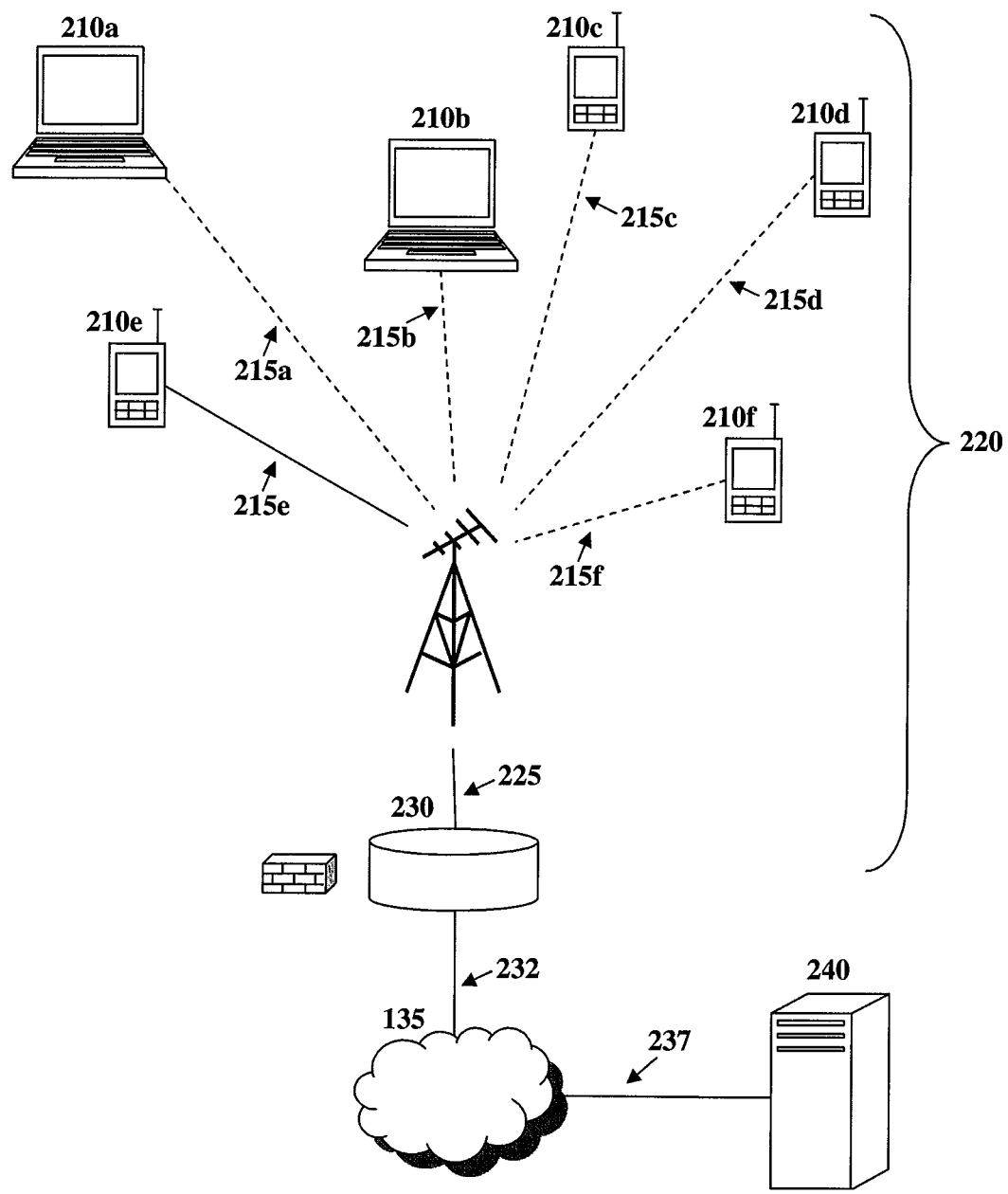
FIG. 2 illustrates a networked system of devices in accordance with embodiments of the invention.

FIG. 2 illustrates an example networked system of devices in accordance with embodiments of the present invention. A first set of client or networked devices 210a-210f, such as wireless/cellular telephones, PDAs, and/or computers associated with a first sub-network 220 such as a mobile device network operator's (MNO) network may require periodic communication, across a network boundary 230, with devices such as internet protocol (IP) based devices residing outside the first sub-network 220, such as a server 240. For example, mobile devices 210a-210f, may communicate with one or more servers 240 to obtain content pertaining to email, device management, news updates, multimedia messages, or other information. The sub-network boundary 230 may optionally include a firewall or network address translator (NAT), for example. The server 240 may be accessible through an external sub-network 135.

In contrast to the prior art example of FIG. 1, mobile devices 210a-210f illustrated in FIG. 2 do not have to communicate with the server fully independently in embodiments of the present invention, but rather may rely on a representative device to facilitate at least some aspects of communication with the server.

In some embodiments of the example illustrated in FIG. 2, the server 240 includes, in its response to the query, a list of client devices from the first set of networked devices 210a-210f for which the server has stored messages or other pending communications, for example 210b and 210f. The list may be received by the representative device 210e or another networked or client device, and notification of client devices 210b and 210f is subsequently carried out. Upon receipt of notification, client devices 210b and 210f may retrieve these stored messages from the server 240 by sending a request over the network paths thereto comprising communication paths 215b, 225, 232, and 237, and 215f, 225, 232, and 237, respectively. Notification can be performed via an intermediate communication device (not shown), or directly from representative device 215e. For example, in some embodiments a local routing function or a direct communication protocol is associated with the network in order to provide one or more of the client devices with the ability to contact other client devices. This local routing function, or direct communication can provide a means for a client device to "wake-up" or send messages to one or more other client devices. For example in some embodiments, sub-network boundary 230 may include a functionality that routes "wake-up" messages between client devices. Furthermore, in a mesh wireless network or a Local Area Network (LAN), a client device can be provided with direct communication with other client devices for the direct transmission of messages therebetween. Notification may further be passive or active, and may be performed based on further operator-defined conditions in some embodiments. For example, an active notification may provide a client device with the ability to actively "ping" another client device prior to transmission of a message, whereas a passive notification may be enabled merely through the transmission of a message from a client device to another client device, wherein the recipient client device automatically "wakes-up" to retrieve the message.

In embodiments of the present invention, since only one communication path need be maintained for plural devices, scalable point-to-multipoint communications can be enabled.

The communication paths 215a-215d and 215f in the present exemplary embodiment are represented by broken lines to reflect the fact that they require less overhead than would be the case without the present invention. For example, polling of the server 240 over these paths may occur less often or not at all, since representative device 210e may perform the requisite polling on behalf of the client other devices.

In some embodiments, the present invention provides a realization of a swarm computing system. A swarm computing system comprises a number of computing devices, each of which can autonomously perform a core set of tasks. Swarm computing systems can have one or more characteristics such as: fault-tolerance, scalability, modularity, and simplicity of components, while potentially handling complex tasks using relatively simple, decentralized operations. One perspective of the present invention is that of a single swarm entity or "device" comprising multiple component devices, which interfaces with a second networked device. Embodiments of the present invention can thus be referred to as "swarm polling," since a swarm system of devices operates to poll a second networked device such as a server.

It is recognized that a potential feature of swarm computing is the ability to spread tasks between multiple members of the swarm. Therefore, although embodiments of the present invention are oriented toward using a representative device to perform certain operations, it is contemplated that some of these operations, or other operations carried out in accordance with the present invention, may be distributed between members of the swarm, for example other client or networked devices.

Network Configuration

The present invention involves multiple networked or client devices, such as laptops, cellular telephones, PDAs, networked cameras, portable gaming stations, or the like, belonging to a first set of two or more networked devices coupled to a network such as a wired, wireless or optical network. The invention also involves one or more second networked devices such as servers, and may optionally comprise one or more intermediate networked devices in the network such as base stations, routers, switches, hubs, firewalls, NATs, and the like.

Embodiments of the network for use with the invention comprise communication paths between two or more client devices and a server device. Communication paths may in general be direct or indirect, for example using multi-hop capabilities to forward messages using one or more intermediate devices. In order to realize the full benefits of some embodiments of the present invention, for example wherein the representative device acts as a relay, it is generally considered that at least one communication path should exist between two client devices that does not involve the server as an intermediate device.

It is contemplated that various physical communication media, signalling schemes, protocols, and the like can be used for communication, including those relating to wired, wireless and/or optical communication of various types. Forms of communication may potentially vary throughout the network, provided that sufficient means to translate messages from one form to another are present where required. In some embodiments, the present invention is operable with a wireless network such as a CDMA or Wi-MAX network or the like, coupled to a wired TCP/IP network or the like, which may be provided through a firewall.

In some embodiments, the invention is operable with one or more wired or wireless networks configured according to protocols relevant to various physical layer, link layer, network layer, transport layer, and/or other layers. Configuration of such networks and specific protocol usage would be readily understood by a worker skilled in the art.

Embodiments of the invention may be implemented using a network having one or more firewalls. A firewall can comprise one or more communication devices, each of which may comprise one or more sub-devices as would be understood by a worker skilled in the art. For example, a firewall can comprise a perimeter network, one or more bastion hosts, one or more proxy servers, one or more packet filters, one or more static or dynamic network address translators (NATs), and/or one or more stateful inspection modules.

For example, a NAT, as described in P. Srisuresh and K. Egevang, "Traditional IP Network Address Translator (Traditional NAT)", Request for Comments No. 3022, January, 2001, Internet Engineering Task Force" and related documents, can be used to map one set of IP network addresses to another. This has potential security applications, since a packet cannot reach its intended recipient without being routed through the NAT, which provides the opportunity for packet inspection and approval by the NAT. A NAT can be used to enable communication between devices residing in a private address space and devices residing in a public address space.

As another example, a stateful inspection module, for example as described in U.S. Pat. No. 5,606,668, may be active in a networked device forming part of the firewall, sometimes referred to as a stateful firewall. Stateful inspection modules can block unwanted incoming communication, while allowing incoming communication that was generated in response to outgoing communications. A basic stateful inspection module in an IP-based network may track packet characteristics such as source and destination address, port numbers, sequence numbers, and the like. These characteristics are used to create a list of allowed or established connections. Characteristics of incoming communication packets are then inspected to determine if they belong to an established connection, and allowed through the stateful inspection module only if they belong to such an established connection. Entries in the allow list can be set to expire after a predetermined time period and/or upon detection of behaviours violating a predetermined set of criteria.

Embodiments of the invention may be beneficially implemented in networks having at least one bottleneck, the bottleneck potentially linked to degradation in service when the amount of client communication through the bottleneck increases beyond a threshold. For example, a server, firewall, base station, hub, router or other networked device on a portion of a network path shared by plural members of the first set of two or more networked devices, such as client devices, can be such a bottleneck. Embodiments of the present invention may result in more efficient use of client device communications through the bottleneck, thereby alleviating potential degradation issues. For example, instead of multiple client devices creating network traffic through the bottleneck due to independent polling or other activities, a representative client can perform polling or other activities on behalf of one or more other client devices, or on behalf of itself and one or more other client devices. This combination of effort can allow for network activities to be performed with reduced overhead.

Embodiments of the present invention may be implemented in a network comprising two or more sub-networks, for example a wireless sub-network interfaced with a wired sub-network, wherein the first set of two or more networked devices are associated with the wireless sub-network and the second networked device is associated with the wired sub-network. As another example, two or more sub-networks may be distinguished by network boundaries such as firewalls, interfaces between different network types, or the like. Other logical sub-network boundaries can be configured, for example at the discretion of a network administrator.

In some embodiments, a "swarm" or first set of networked or client devices may be associated with multiple sub-networks, for example different members of the first set of networked devices can be associated with one of two or more sub-networks. In this case, embodiments of the present invention may be configured such that representative devices poll primarily on behalf of other networked or client devices associated with the same sub-network, so that notifications need not be sent across sub-network boundaries if possible.

Representative Device

The present invention provides for one or more representative devices belonging to the first set of two or more networked devices. The representative device performs tasks which may benefit at least one other member of the first set of two or more networked devices. For example, when members of the first set of networked or client devices periodically or intermittently receive messages from a second networked device such as a server, for example at substantially unpredictable times, the representative device can maintain a communications channel such as a periodic or intermittent network path to the second networked device, wherein the path can be usable to facilitate communication between the first set of networked or client devices and the second networked device. In embodiments of the present invention, such a path may facilitate a reduction in network overhead, for example by reducing the requirements for other members of the first set of networked devices to independently establish their own network paths.

In some embodiments, the representative device may establish a network path by querying the second networked device on behalf of other members of the first set of networked devices. The second networked device may use the established network path for communication with members of the first set of networked devices. For example, the second networked device may respond to the representative device with an indication of messages pending for members of the first set of networked devices. The indications of messages pending may then be forwarded to those networked devices. For example, the representative device and/or another networked device may act as a communication relay for relaying indications of pending messages.

In some embodiments, the representative device can be any one of the first set of two or more networked devices. For example, if the first set of two or more networked devices is a set of mobile devices such as laptops, cellular telephones, PDAs, or the like, each member of the first set may be equipped to operate as a representative device if so triggered to.

In some embodiments, the representative device can be any one of a subset of the first set of two or more networked devices. For example, some members of the first set of two or more networked devices can be specially equipped to become a representative device if so triggered, and the subset can comprise such members. For example, a subset of mobile devices can be specially equipped with hardware, firmware and/or software enabling them to become a representative device if so triggered. As another example, one or more devices specially provided by a network administrator can be equipped to become representative devices. For example, devices operatively coupled to a firewall or base station in a sub-network can temporarily or permanently operate as representative devices, thereby alleviating this burden from other networked devices in the sub-network, such as mobile, customer or client devices.

In some embodiments, the representative device and/or subset of potential representative devices may be determined according to one or more additional factors. For example, networked devices with higher battery power, signal quality, or more central location within a network or sub-network may be selected as representative devices with a higher probability, more often, or more preferably over other networked devices. In one embodiment, devices having certain characteristics, such as battery power below a predetermined threshold, may not be candidates for selection as representative devices at all. As another example, fairness measures may be used to spread or share the role of being a representative device, for example by preferentially selecting networked devices to be representative devices if they have not already served as a representative device in the recent past. Other fairness measures and implementation thereof would be understood by a worker skilled in the art.

In some embodiments, the representative device can be dynamically selected. For example, each potential representative device may dynamically self trigger or self select to become a representative device for a period of time, for example randomly or according to a schedule. As another example, potential representative devices may be selected according to a combination of self-selection or self-triggering and negotiation and/or coordination. For example, a networked device which self selects or self triggers may check whether there are already a sufficient number of other representative devices before becoming a representative device itself. Such a process may be similar to multi-access communication protocols such as time division multiple access, Token Ring, or "listen before talk" methods such as carrier sense multiple access, collision avoidance, ALOHA, Ethernet, or the like. As another example, representative devices may be selected by an administrative device such as a centralized controller. It is envisioned that many different methods of stochastic, deterministic, centralized, decentralized, hierarchical, cooperative, competitive, or like schemes can be used to dynamically select representative devices according to embodiments of the present invention.

For example, selection of a representative device according to self-selection may be provided stochastically as follows: every T seconds, each potential representative device may become a representative device with probability p, where T and p are parameters specific to each networked device or set of networked devices. Alternatively, selection according to self-selection may be provided deterministically as follows: every nT+k seconds, each potential representative device becomes a representative device, where n and k are parameters specific to each networked device or set of networked devices, for example configured to result in appropriate numbers of representative devices over time.

In some embodiments, dynamic selection can comprise adaptive selection such as adaptive randomized self-selection or scheduling. For example, as the number of potential representative devices increases, the frequency or probability of self-selection can correspondingly decrease according to feedback. Increases or decreases in self-selection may also be facilitated through centralized or decentralized feedback mechanisms to improve other system metrics.

Transmitting a Query

In embodiments of the invention, the representative device transmits a query message to the second networked device, such as a server. For example, the query can represent a request for the second networked device to forward messages pending for the representative device, if available. In some embodiments, there need not be any special configuration of the query itself; the second networked device can be configured to respond to a standard query in accordance with the present invention. As another example, the query can represent a request for the second networked device to forward any messages pending for the representative device, along with indications of messages pending for other members of the first set of networked devices.

In some embodiments, the query can explicitly or implicitly include an indication of a subset of the first set of networked devices for which the second networked device may return an indication of messages pending. For example, the representative device may include in its query a list of addresses, address masks, or lookup table index, indicating networked devices for which the second networked device may return indications of messages pending, if applicable.

In some embodiments, the query can include a schedule restricting the rate of transmission of indications of messages pending to a predetermined maximum. For example, the query can specify a maximum number of indications of messages pending for other members of the first set of networked devices that should be sent by the second networked device in response to the query. Such restrictions may be configured so as to reduce the chance of an undesired flood of network activity, for example due to a large number of client devices subsequently retrieving messages from a server. A leaky bucket or token bucket mechanism can optionally be used for this purpose, as would be readily understood by a worker skilled in the art.

Responding to a Query

In embodiments of the invention, the second networked device in receipt of a query transmits a query response. The query response may be addressed to the representative device which transmitted the query. However, it is recognized that embodiments of the invention could be realized wherein the query response were addressed to or intercepted by an appropriate intermediate device. For example, a device coupled to a firewall, and residing on the same side of the firewall as the representative device, could receive the query and subsequently process and transmit notifications as described below.

In some embodiments, the query response to the representative device can include sending a message pending for the representative device, provided such a pending message is available. The message can be stored at the second networked device or server, which can be configured to respond to the query by performing a look-up operation to check for pending messages intended for the representative device, and to package and send one or more such pending messages if found.

In some embodiments, the query response can include an indication of a subset of the first set of two or more networked devices for which communications are pending. For example, an encoded or unencoded list, address mask, or the like can be transmitted in the query response, indicating all or a portion of networked or client devices of the first set of networked devices for which one or more messages are pending. The messages can be stored at the second networked device, which is configured to respond to the query by performing a look-up operation to check for pending messages intended for networked devices represented by the representative device, for example members of the first set, and to package and send indications of one or more such pending messages if found. The look-up operation can be parameterized by factors such as the address of the representative device, contents of the query such as limitations on the number of messages and/or indications of which networked devices for which indications should be sent, and/or factors internal to the second networked device such as pertain to bandwidth limitations.

In some embodiments, portions of pending messages, or indicators based on message content, can be sent with the query response. In this manner, networked devices receiving a notification of pending messages can determine or schedule retrieval of said messages based on an indication of content. For example, more urgent messages may be retrieved immediately, while less urgent messages may be retrieved later or not at all.

In some embodiments, the query response can implicitly or explicitly include other feedback for use in configuring the generation of future queries. For example, if there are no messages pending, an implicit or explicit notification can be transmitted to the representative device, which may result for example in a reduction in frequency of future queries. Other methods of feedback may also be implemented. For example, the number of pending messages residing at the second networked device at the time of each query may be used to adjust the frequency or scheduling of future queries and/or the number of representative devices. Moreover, feedback can be provided to the representative device only, or to multiple devices of the first set of two or more networked devices or potential and/or current representative devices. For example, a representative device can operate according to an ant colony optimization algorithm, as is known in the art, such as by transmitting a "pheromone" signal based on its query responses, said "pheromone" signal used to adjust the behaviour of other networked devices, such as by increasing or decreasing the frequency of queries and/or number of other representative devices.

In some embodiments, the second networked device or server can schedule queries from multiple networked devices such as representative devices in order to manage network resources. For example, a server can communicate with representative devices to specify different schedules for transmission of queries from different representative devices. The server can use scheduling techniques to reduce overlap of queries from different networked devices, thereby spreading out the usage of network resources such as bandwidth. For example, time division multiplexing methods, or other scheduling including specification of query frequency, time offset, and the like, can be used for this purpose. In a further embodiment, the server can scale the scheduling to accommodate an increase or decrease in the number of representative devices and/or the number of networked or client devices in the first set of networked devices.

In some embodiments, if there are no messages pending for the representative device, and if transmitting the query from the representative device has the effect of facilitating establishing communication paths from the second networked device to other members of the first set of two or more networked devices, as described above, there may be no direct query response transmitted from the second networked device.

In some embodiments, the number of indications of messages pending included in the query response can be limited. For example, if messages are pending for N members of the first set of two or more networked devices, and N>M for some parameter M indicating the maximum number of networked devices, the query response may be transmitted with indications of messages pending for only M out of the N members. In this manner, the second networked device can limit the number of subsequent and substantially simultaneous requests that may result from too many members attempting to retrieve their messages from the second networked device. In addition, queuing algorithms can be implemented to ensure notifications are not delayed longer than necessary.

In some embodiments, indications of messages pending can include characteristics which limit the rate of subsequent pending message retrieval requests. For example, indications can be made at a limited rate, or they can include an instruction or signal causing retrieval of the pending message to be delayed, by causing one or more of the intermediate or receiving networked devices handling the message to delay one or more actions upon message receipt.

Processing Query Response

Embodiments of the present invention provide for processing of the query response sent by the second networked device. In some embodiments, the recipient of the query response is the representative device. In some embodiments, the recipient of the query response is another networked device, for example a networked device can be configured to intercept the query response, or a networked device that the second networked device has addressed the query response to.

In some embodiments, the recipient may process the query response to retrieve messages intended therefor, if such a message is part of the response.

In some embodiments, the recipient of a query response may examine the response to determine if any indications of pending messages for other members of the first set of two or more networked devices are present. If such indications are present, the recipient may process the indications to determine the addresses of members for which communications are pending. In an alternative embodiment, the recipient may forward the indications to another networked device, such as a hub or networked device coupled to the firewall, which processes the indications.

In some embodiments, processing the indications comprises one or more network address translation or lookup operations. For example, the indications sent by the server may be addressed to members of the first set of two or more networked devices according to one format, which is translated to another format more useful for transmitting notifications, as described below.

Notifications

Embodiments of the present invention provide for notifying identified members of the first set of networked devices for which messages are pending. For example, notification messages can be transmitted from the representative device or other networked device to the identified members. Notifications may be transmitted through direct peer-to-peer connection or through multi-hop network paths. It is appreciated that there are several applicable routing and/or connection protocols for facilitating transmission of notifications in this manner.

In some embodiments, notifications are routed through an intermediate networked device. For example, the representative device can transmit notifications to the intermediate device for distribution to the intended notification recipients, namely one or more other networked devices belonging to the first set of two or more networked devices. Notifications can be transmitted one at a time or in batches. In a further embodiment, the intermediate device can provide network address translation capabilities. For example, if the second networked device is separated from the first set of networked devices by a NAT, the second networked device may send notifications based on external network addresses. As such, the notifications may then be routed by the intermediate device using an address translation table obtained from the NAT.

In some embodiments, a notification may not involve active transmission of notification messages to members of the first set of networked devices. For example, the representative device may set a message pending flag in its own memory or the memory of an intermediate device. Members of the first set of networked devices may periodically query such a memory in order to determine if a message is pending therefore. This configuration of pending message notification may be is less demanding than polling the second networked device or server since the flag is define in a locally accessible memory. For example, if a message pending flag is set for a particular networked device, the query response from the memory to that networked device can indicate a message pending, and the message can subsequently be retrieved.

It is noted that the notification process provides a communication path between the second networked device and the members of the first set of networked devices which can potentially receive notifications. That is, the second networked device can communicate with members of the first set of networked devices by relaying notifications through the representative device. This is true even if the second networked device does not transmit the entire pending message, but only a notification of the pending message, since the networked device receiving the notification can subsequently retrieve the pending message.

For example, a networked device in receipt of a notification can send a message to the second networked device or server requesting delivery of the message, and the second networked device can respond by transmitting the message in an appropriate fashion. In one embodiment, the delivery request is transmitted through a firewall, and enables delivery of the message by establishing a connection through the firewall, for example in the case of a firewall implementing stateful inspection.

It is recognized that the above may lead to further embodiments, recognizable as a hierarchical configuration of embodiments of the present invention. For example, the representative device may operate as described above, but may further act as a server to be polled by sub-representative networked devices. In this manner, multi-layered, hierarchical configurations of the present invention may be provided.

Apparatus and System

Embodiments of the invention include a networked system or apparatus such as the first set of two or more networked devices, for example client computers, PDAs, cellular telephones, laptops, mobile device electronics, or the like, the second networked device, for example a server, and optionally intermediate networked devices for example firewalls, routers, NATs, or the like. Devices according to embodiments of the present invention can be based largely upon their prior art counterparts, with only limited adjustments to hardware, software, and/or firmware made to configure the networked devices to perform operations according to embodiments of the present invention. Alternatively, networked devices according to embodiments of the present invention can be specifically made or manufactured to operate as described herein.

It is understood that the present invention is useful for supporting other functions, such as communication with and administration of networked devices, for example to maintain a network of wireless mobile devices, supply services such as email, data transfer, voice or video services, and the like. Therefore, networked devices or systems thereof as described herein may not be limited to the functionality described with respect to embodiments of the invention, but may carry out other functions, such as those typical to networked devices.

The invention will now be described with reference to specific examples. It will be understood that the following examples are intended to describe embodiments of the invention and are not intended to limit the invention in any way.

EXAMPLES

Example 1

Figure 3A:
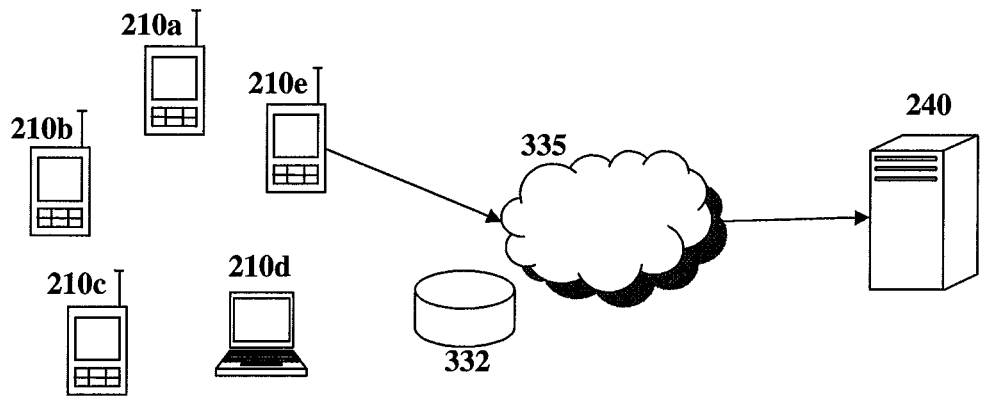
FIGS. 3A-3C illustrate a sequence of operations for facilitating communication between two or more first networked devices and a second networked device, executed in accordance with embodiments of the invention.
Figure 3B:
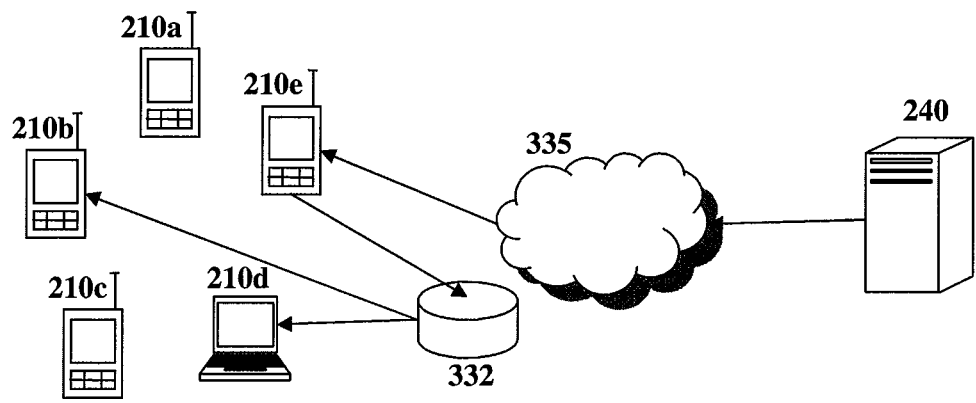
Figure 3C:
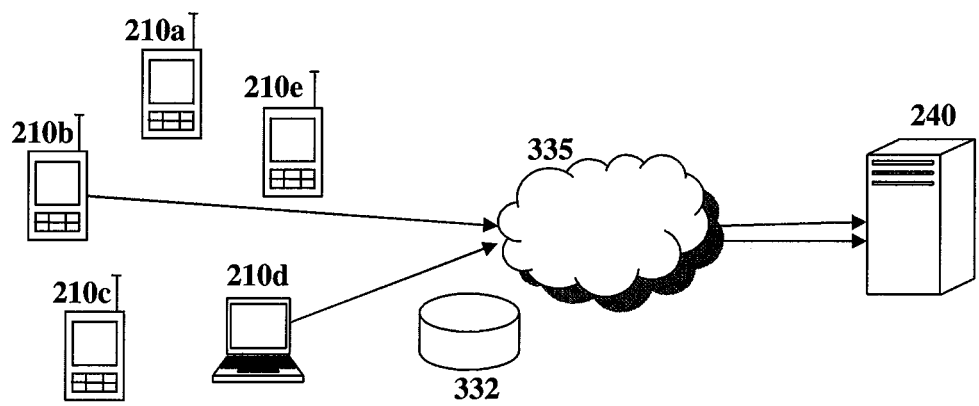

FIGS. 3A-3C illustrate a sequence of operations executed in accordance with one embodiment of the invention. In FIG. 3A, a representative device 210e of a first set of networked devices 210a-210e initiates communication with a server 240, for example by sending a query. There may be more or fewer devices in the first set of networked devices. The communication passes through a network 335 which may optionally include a firewall or other sub-network boundary. In FIG. 3B, the server 240 responds to the communication by sending a response message to the representative device, the response message including an indication of a subset of the first set of networked devices 210a-210e for which one or more communications are pending. For example, the indication may include addresses or other indicators corresponding to devices 210b and 210d. The representative device can process the indications and provide notifications to devices in the subset, for example devices 210b and 210d. As illustrated, the notifications can be routed through an intermediate device 332 which may facilitate inter-device communication and network address translation if required. As illustrated in FIG. 3C, the notified 210b and 210d devices can then transmit message retrieval requests to the server 240, the request resulting in transmission of the appropriate pending messages from the server 240 to the devices 210b and 210d.

In a variation of the above example, the representative device can notify the devices for which communications are pending without using an intermediate device 332, for example by direct communication. In both cases, the representative device acts as a relay for message notifications, enabling notified devices 210b and 210d to retrieve pending messages from the server 240 by initiating their own request to the server 240.

Example 2

Figure 4:
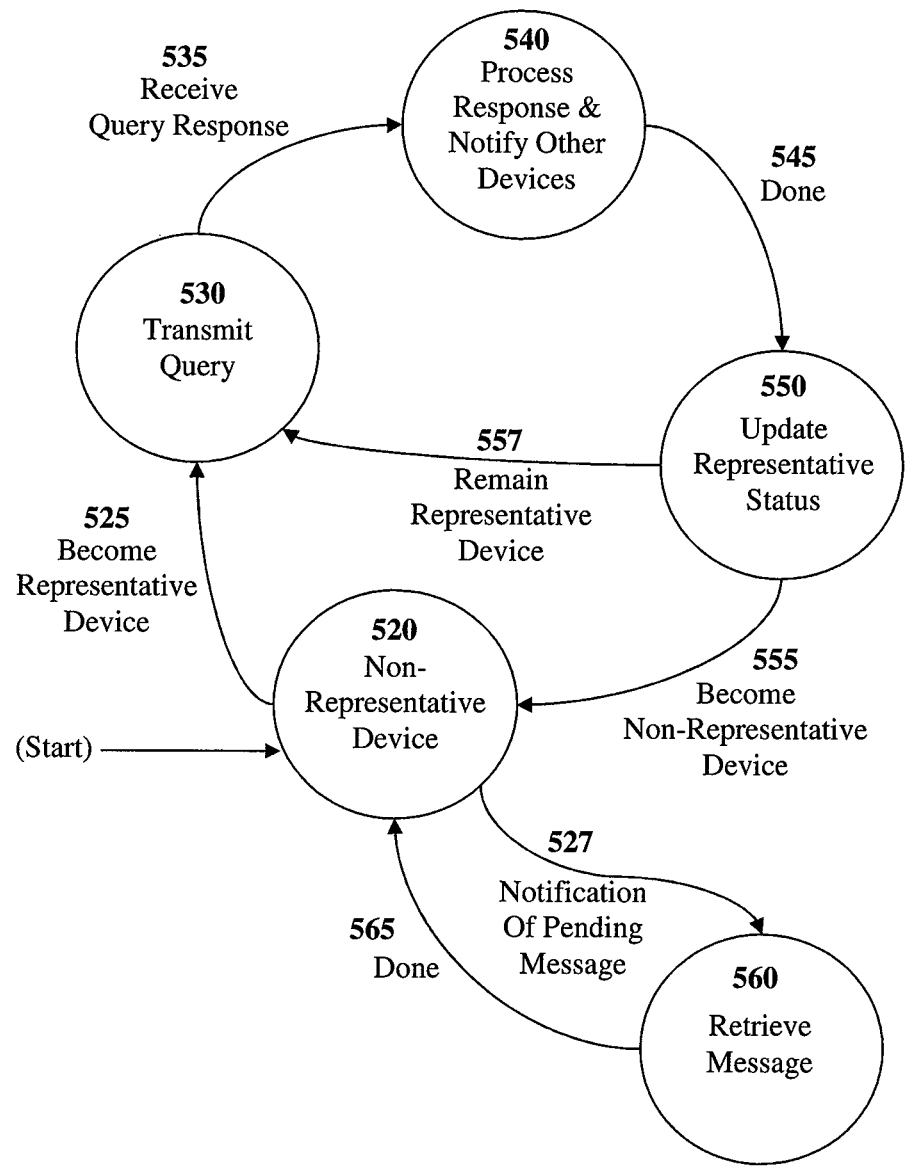
FIG. 4 illustrates a state machine representative of operation of a device in accordance with one embodiment of the invention.

FIG. 4 illustrates a finite state machine (FSM) representative of operation of a device belonging to the first set of one or more devices, in accordance with one embodiment of the invention. The FSM comprises plural modes of operation 520, 530, 540, 550, and 560 of a device, which, as illustrated, can operate as either a representative device or a non-representative device. The modes of operation change as illustrated when triggered by events 525, 527, 535, 545, 555, 557, and 565. Other versions of the device are also possible, for example some devices may be dedicated representative devices or dedicated non-representative devices, thus omitting states 520 and 560, or states 530, 540 and 550, respectively.

In the initial non-representative device state 520, the device waits to receive notification trigger 527, indicative that messages are pending for the device at the server. Upon receipt of such notifications, the device transitions to state 560, wherein the device retrieves the pending messages, for example by sending a request to the server. Message retrieval may be performed immediately on receipt of a notification, after some predetermined interval, or upon satisfaction of further criteria. Upon completion of message retrieval activity, the device is triggered 565 to return to state 520 to await further notification triggers.

From the non-representative device state 520, the device can further be triggered by an event 525 to become a representative device. Such a representative device then transmits queries in state 530, for example immediately or after some predetermined interval or upon occurrence of further predetermined events. In state 530, a query is transmitted to the second networked device or server, as described herein. The device then waits until the server returns a response to the query. Upon receipt 535, the device enters state 540 in which the response is processed. Indications of messages pending for other devices, included in the response, result in a notification operation for notifying one or more of the other devices. The device may also retrieve its own pending messages which may be included in the response, if applicable. Once processing and notification is complete 545, the device enters an update state, in which it may either remain a representative device 557 and transmit another query 530, possibly after some delay or upon satisfaction of further predetermined criteria, or become a non-representative device 555 and enter state 520.

Embodiments of the invention depicted in FIG. 4 may further include other states, such as an idle representative device state (not illustrated), in which the device resides until triggered to transmit a query and thus enter state 530.

In embodiments of the present invention, some or all of the devices belonging to the first set of devices can operate similarly to the device illustrated in FIG. 4. Other devices may be dedicated representative devices or dedicated non-representative devices.

In some embodiments of the invention, some of the states defined in FIG. 4, can occur in parallel. For example, a device which is retrieving a message 560 that it had been notified about, could also be given a list of other devices that have pending messages. This transfer of information can implicitly define this "retrieving" device as a "representative device" and thus cause this device to subsequently change to a state that processes responses and notifies other devices 540.

Example 3

Figure 5:
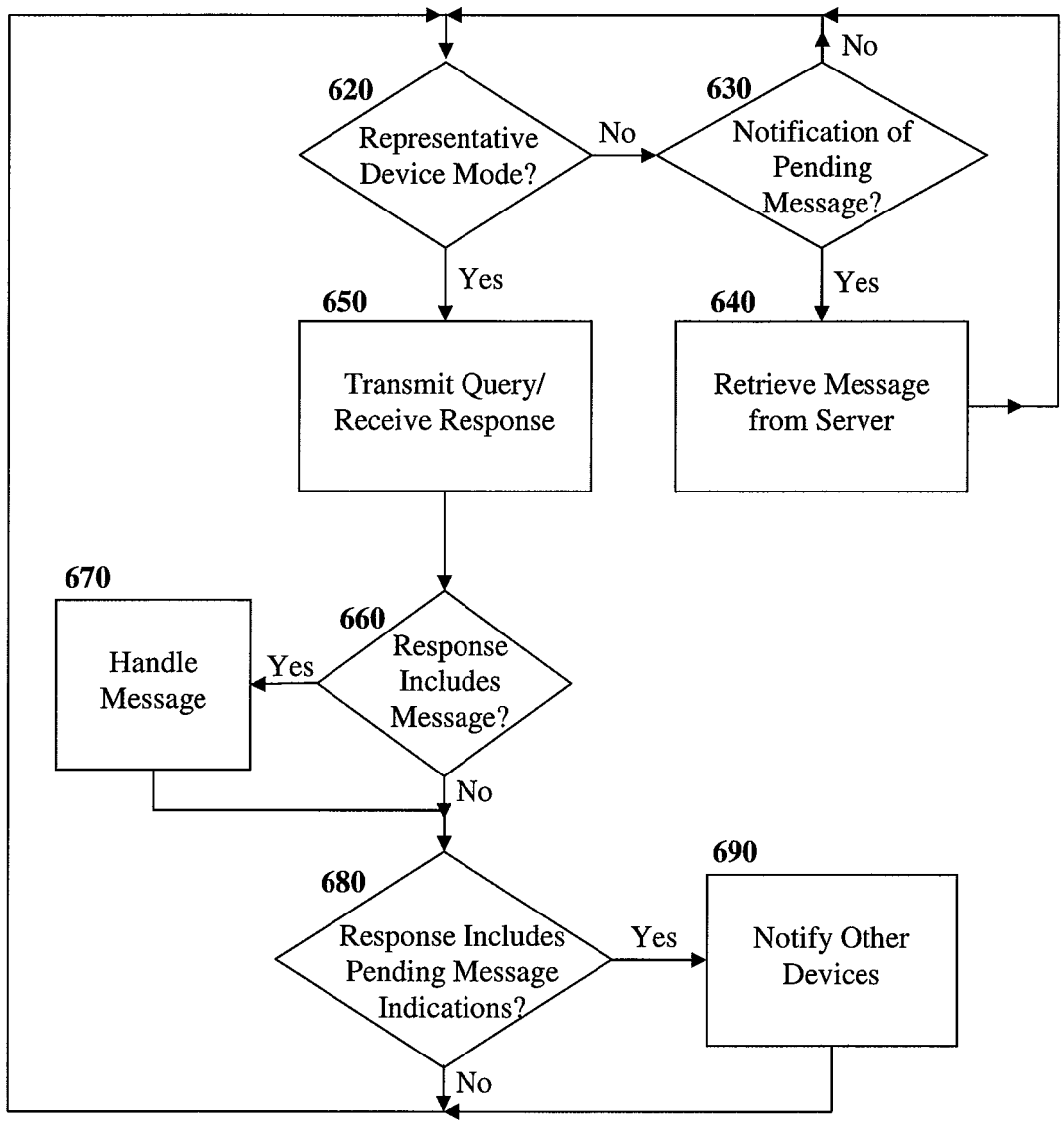
FIG. 5 illustrates a method of operation of a device in accordance with embodiments of the invention.

FIG. 5 is a flow diagram illustrating a method of operation of a device belonging to the first set of one or more devices, in accordance with one embodiment of the invention. The device can operate as either a representative device or a non-representative device, and thus may optionally omit some of the steps illustrated in FIG. 5. In other embodiments, a device can be a dedicated representative device or dedicated non-representative device. In step 620, the device checks whether it is to currently operate as a representative or a non-representative device. If it operates as a non-representative device, it checks for notifications of pending messages in step 630, for example sent to it by other representative devices. If a message is pending, it retrieves the message from the appropriate server in step 640. Otherwise, it returns to step 620. If the device is to operate as a representative device, it transmits a query to the server and receives a response in step 650. The response is then processed. First, the device inspects the response to determine whether it includes a message sent by the server to the device in step 660. If a message is received, it is handled in step 670, for example by storing or forwarding the message to the appropriate destination within the device. Otherwise, the device inspects the response to determine whether it includes one or more indications of pending messages for other devices in step 680. If there are pending messages, a notification operation is initiated in step 690 to notify the other devices of pending messages. The device then returns to step 620.

Example 4

Figure 6:
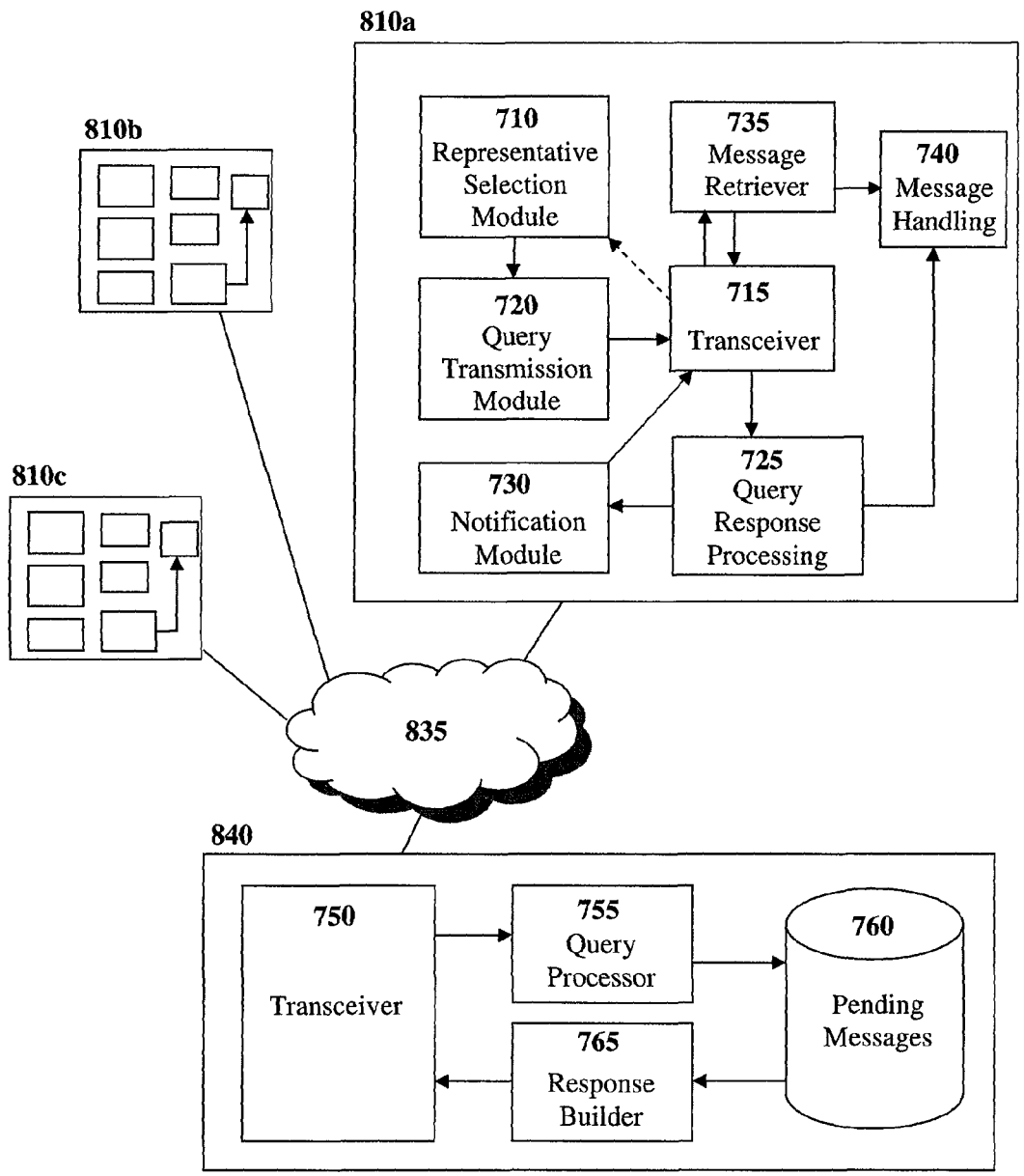
FIG. 6 illustrates a networked system of devices in accordance with embodiments of the invention.

FIG. 6 illustrates a networked system of devices in accordance with one embodiment of the invention. The system comprises a first set of networked devices 810a-810c and a second networked device 840 such as a server, communicatively coupled through a network 835. The first set of networked devices may include more or fewer devices than is illustrated here. Device 810a is described below; devices 810b and 810c may be similar to device 810a, or otherwise operable according to embodiments of the present invention. The device 810a can operate as either a representative device or a non-representative device. In other embodiments, the device 810a can be a dedicated representative device or dedicated non-representative device, and may accordingly have more or fewer components than are illustrated in FIG. 6.

The device 810a comprises a representative selection module 710, which is operable to determine whether the device is to currently operate as representative device or as a non-representative device. The representative selection module 710 can receive input from the transceiver 715 for this purpose, for example to coordinate or regulate the occurrence of representative devices in the first set of networked devices using feedback.

A representative device can trigger operation of the query transmission module 720, which transmits a query to the server 840 using the transceiver 715. Responses from the server are processed by the query response processing module 725. Messages potentially embedded in the response intended for the device 810a can be provided to the message handling module 740, which handles the message as appropriate. Indications of messages pending for other devices of the first set of networked devices 810a-810c are passed to the notification module 730. The notification module 730 configures notifications intended for other devices, for example by transmitting notifications of messages pending via the transceiver 715. Notifications received by the transceiver 715 can be passed to the message retriever module 735, which initiates retrieval of the message from the server and passes the retrieved message to the message handling module 740. For example, message retrieval may include: sending a request to the server to transmit the message, waiting for message transmission, receiving message transmission, and storing, displaying, and/or processing the message.

Continuing with respect to FIG. 6, the server 840 includes a transceiver 750, which is operable to communicatively couple the second networked device or server 840 with the first set of networked devices 810a-810c, via the network 835. The server 840 further includes a query processor module 755 operatively coupled to the transceiver 750, which is configured to receive and process queries from a representative device of the first set of networked devices 810a-810c. The query processor module 755 may also receive and process message retrieval requests from non-representative devices of the first set of networked devices 810a-810c. In response to a query from a representative device, the query processor module 755 checks a database of pending messages 760 for messages pending for the representative device and/or other devices of the first set of networked devices 810a-810c. Depending on the parameters set at the server and/or provided in the query, some or all of the pending messages (for example up to a predetermined limit) are provided to the response builder module 765, which constructs a query response. The query response may include a message pending for the representative device sending the query, as well as indications of messages pending for other devices of the first set of networked devices 810a-810c. The query response is then transmitted by the transceiver 750.

Continuing with respect to FIG. 6, in response to a message retrieval request from a non-representative device, the query response module 755 retrieves the appropriate message from the database of pending messages 760. The message is packaged at the response builder module 765 and transmitted by the transceiver 750 back to the requesting device.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer and/or firmware according to the method of the invention and/or to structure its components in accordance with the system of the invention.

In addition, while portions of the above discuss the invention as it can be implemented using a generic OS and/or generic hardware, it is within the scope of the present invention that the method, apparatus and computer program product of the invention can equally be implemented to operate using a non-generic OS and/or can use non-generic hardware.

Further, each step of the method may be executed on any general computer, such as a personal computer, server or the like, or system of computers, and pursuant to one or more, or a part of one or more, program elements, modules or objects generated from any programming language, such as C++, Java, Pl/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A system for facilitating communication between a first set of two or more networked devices and a second networked device, the system comprising:

a representative device configured to transmit a query message via a network to the second networked device, the representative device being an electronic wireless communication device belonging to the first set of two or more networked devices, wherein the query message is transmitted on behalf of plural members of the first set of two or more networked devices, and wherein the query message facilitates providing communication paths from the second networked device to the plural members;

wherein the second networked device is configured, in response to the query message, to transmit a response message addressed to the representative device, the response message comprising an indication of a subset of the plural members for which one or more communications are pending;

wherein an electronic device of the system is configured to process the response message to identify one or more of the networked devices belonging to the subset and send a notification to each identified networked device belonging to the subset;

wherein a specific identified networked device of the first set of two or more networked devices is configured, upon receiving the notification, to transmit a message retrieval request to the second networked device; and wherein, upon receiving the message retrieval request, the second networked device is configured to transmit a corresponding pending message to the specific identified networked device.

2. The system of claim 1, wherein the electronic device is an intermediate device communicatively coupled to the first set of two or more networked devices, wherein the intermediate device is configured to intercept the response message or receive the response message forwarded from the representative device to the intermediate device.

3. The system of claim 1, wherein the electronic device is the representative device.

4. The system of claim 1, wherein the query message explicitly defines a further subset of the first set of networked devices, wherein said subset of the first set of two or more networked devices for which one or more communications are pending is restricted to be within said further subset.

5. The system of claim 1, wherein the query message defines a maximum number of indications of messages pending for other members of the first set of two or more networked devices for inclusion in the response message, and wherein the response message is restricted to include less than or equal to said maximum number of indications.

6. A non-transitory computer readable medium having recorded thereon statements and instructions for execution by one or more computers to carry out operations for facilitating communication between a first set of two or more networked devices and a second networked device, the operations comprising:

a) transmitting a query message from a representative device to the second networked device, the representative device belonging to the first set of two or more networked devices, wherein the query message is transmitted on behalf of plural members of the first set of two or more networked devices, and wherein the query message facilitates providing communication paths from the second networked device to the plural members; and b) in response to the query message, transmitting a response message from the second networked device, the response message addressed to the representative device, the response message comprising an indication of a subset of the plural members for which one or more communications are pending;

c) processing the response message to identify one or more of the networked devices belonging to the subset; and d) sending a notification to each identified networked device belonging to the subset;

e) upon receiving the notification by a specific identified networked device, transmitting a message retrieval request from the specific identified networked device to the second networked device; and f) upon receiving the message retrieval request at the second networked device, transmitting a corresponding pending message from the second networked device to the specific identified networked device.

7. A method for facilitating communication between a first set of two or more networked devices and a second networked device, the method comprising the steps of:

a) transmitting a query message from a representative device to the second networked device, the representative device belonging to the first set of two or more networked devices, wherein the query message is transmitted on behalf of plural members of the first set of two or more networked devices, and wherein the query message facilitates providing communication paths from the second networked device to the plural members;

b) in response to the query message, transmitting a response message from the second networked device, the response message addressed to the representative device, the response message comprising an indication of a subset of the plural members for which one or more communications are pending;

c) processing the response message to identify one or more of the networked devices belonging to the subset;

d) sending a notification to each identified networked device belonging to the subset;

e) upon receiving the notification by a specific identified networked device, transmitting a message retrieval request from the specific identified networked device to the second networked device; and f) upon receiving the message retrieval request at the second networked device, transmitting a corresponding pending message from the second networked device to the specific identified networked device.

8. The method of claim 7, further comprising the step of:
selecting the representative device from the first set of two or more networked devices, wherein selecting is performed based on predetermined criteria.

9. The method of claim 7, wherein the response message is received and processed at the representative device.

10. The method of claim 9, wherein the representative device sends the notification to each networked device in the subset of the first set of two or more networked devices.

11. The method of claim 7, wherein the query message explicitly defines a further subset of the first set of networked devices, wherein said subset of the first set of two or more networked devices for which one or more communications are pending is restricted to be within said further subset.

12. The method of claim 7, wherein the query message defines a maximum number of indications of messages pending for other members of the first set of two or more networked devices for inclusion in the response message, and wherein the response message is restricted to include less than or equal to said maximum number of indications.

* * * * *